Jan. 7, 1969  J. M. TYLER ET AL  3,420,053
AIRCRAFT LAUNCHING THRUST AUGMENTATION SYSTEM
Filed Jan. 18, 1967
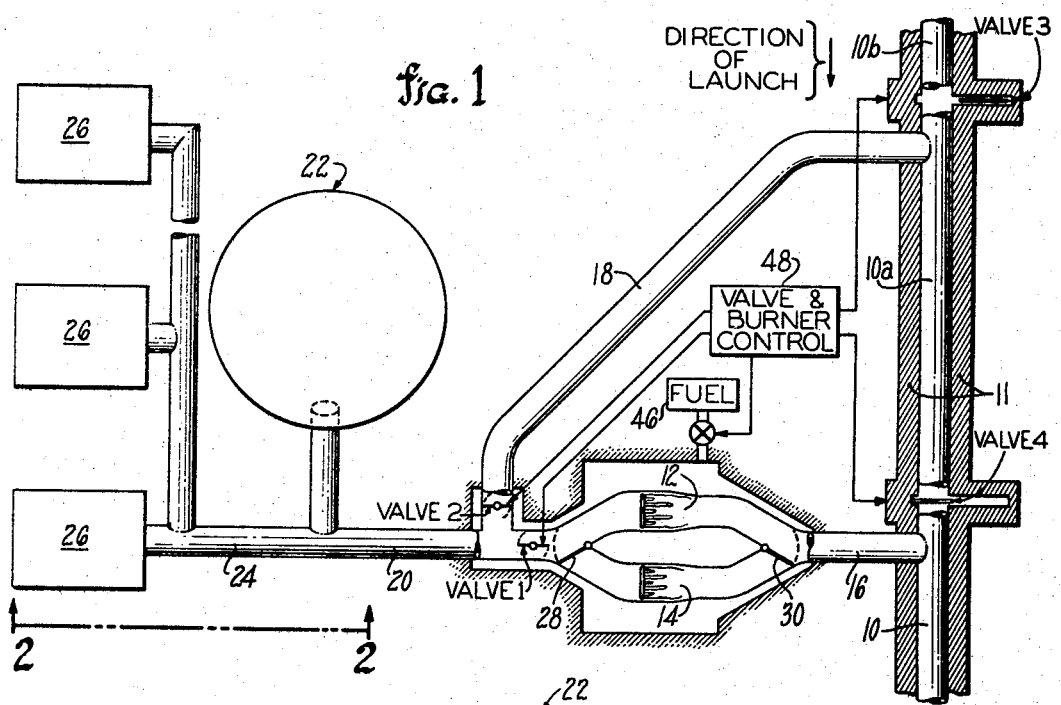
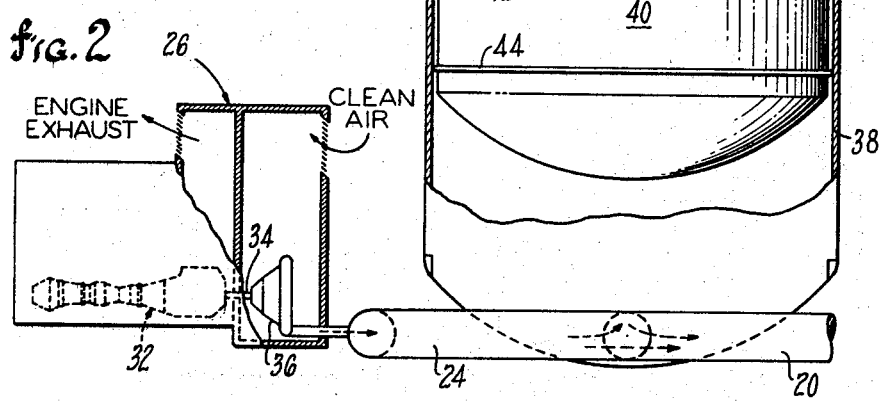
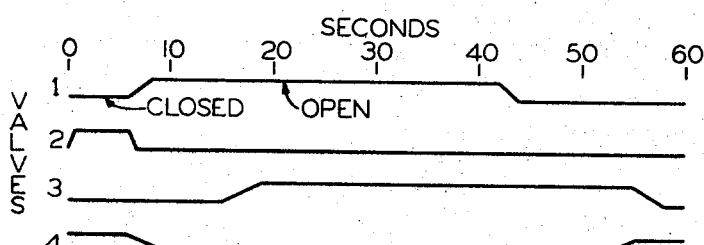
INVENTORS
JOHN M. TYLER
FREDERICK D. HAVENS
RICHARD C. HICKOK
ERNEST FEDER
BY Melvin Pearson Williams
ATTORNEY

United States Patent Office 3,420,053
Patented Jan. 7, 1969

3,420,053
AIRCRAFT LAUNCHING THRUST AUGMENTATION SYSTEM
John M. Tyler, Glastonbury, Frederick D. Havens, Bloomfield, Richard C. Hickok, East Hartford, and Ernest Feder, Hartford, Conn., assignors to United Aircraft Corporation, East Hartford, Conn., a corporation of Delaware
Filed Jan. 18, 1967, Ser. No. 610,129
U.S. Cl. 60—39.01            4 Claims
Int. Cl. B64g 5/00

ABSTRACT OF THE DISCLOSURE

A plurality of turbofan jet engines supply large volumes of high pressure air to a weight-controlled, constant-pressure, variable-volume accumulator, which in turn feeds air to a burner that essentially doubles the volume of air supplied thereto through the combustion of fuel at a high rate over short periods of time. The output of the burner is used to force a cart-mounted aircraft launching apparatus down a long pneumatic thrust cylinder (such as catapult) by means of a piston slidably disposed therein.

CROSS-REFERENCES TO RELATED APPLICATIONS

The invention is particularly suited for use in high volume aircraft launching pneumatic thrust systems, such as of the type disclosed in a copending application of the same assignee entitled Aircraft Launching, filed on even date herewith by John M. Tyler, Serial No. 610,132. The launch cylinder may be of the type described in another copending application of the same assignee filed on even date herewith by Ernest Feder, John Kransnitski and Peter T. Vercellone, Serial No. 610,130.

BACKGROUND OF THE INVENTION

*Field of invention.*—This invention relates particularly to the generation of large volumes of pressurized fluid suitable for use in operating a long fluid pressure aircraft launching device, such as a catapult.

*Description of the prior art.*—The launching of aircraft with ground-oriented assistance has long been well known in the form of catapults which are used on board ship and on short tactical land runways so as to assist the aircraft engine in imparting extremely high accelerations to aircraft, thereby causing the aircraft to reach liftoff speed in a lesser distance than would be possible under the thrust of the aircraft's engines alone. Such devices are relatively short in terms of the normal, unassisted take-off distance for any given aircraft. Particularly, catapults known to the prior art are measured in feet, or hundreds of feet, and therefore relate to a reasonable volume of pressurized gas in order to effect the full displacement of the launching device.

In the aforementioned Tyler application, a pressurized fluid launching device may be as long as two and one-half miles, and may be operating against an aircraft having a gross weight on the order of magnitude of half a million pounds. For such a launching device, huge quantities of pressurized fluid are required.

In addition, the method disclosed in said Tyler application contemplates launching the aircraft in response only to ground-generated power, the engines on the aircraft being operated at idle speed and supplying very little thrust during the launching of aircraft, so as to mitigate aircraft takeoff noise.

Sources of pressurized fluid used for the relatively short catapults known to the prior art are not practical for use in long launching devices which are required to launch aircraft of maximum gross weight.

Furthermore, not only is a huge quantity of pressurized fluid required, but in order to operate on a commercially feasible basis, a large number of takeoffs must be implemented in a relatively short amount of time, thus there is relatively no time allowed for recovery of the pressurized fluid source between launches, the source having to supply a virtually constant volume of pressurized fluid when considered in the light of the normal recovery rates for such sources.

SUMMARY OF THE INVENTION

The object of the present invention is to provide an improved, high volume source of pressurized fluid, suitable for use in the launching of extremely heavy aircraft by means of a relatively long pneumatic launching cylinder apparatus.

According to the present invention, a power-driven fan supplies clean air to a burner apparatus which burns fuel at a high rate, thereby increasing the volume of the air by at least an order of magnitude, the increased volume air being utilized to drive the piston of a pneumatic cylinder.

In accordance with a further aspect of the present invention, the clean air is supplied at a steady rate, and the burners are utilized only during the positive drive portion of each launch cycle; in order to minimize the maximum capacity of the source of clean air so as to supply the maximum amount required by the burners during the positive drive portion of a launch operation, a constant pressure air accumulator is used to store up pressurized air during periods of time which fall between the positive driving portions of launching operations, so that accumulated air is available during the peak air requirements of the launching operation.

A more specific aspect of the present invention provides a constant pressure, variable volume air accumulator which, in one embodiment, is achieved with a gravity forced weighted piston accumulator.

A further aspect of the present invention includes provision of a series of air locks which are controlled by a plurality of valves so as to permit connecting a second aircraft for a second launch during the time of launching of a first aircraft, whereby maximum utilization of the apparatus herein, and related aircraft launching apparatus, may be made without having more than one source of aircraft launching pneumatic pressure, and without hindering the efficiency of the operation.

The invention utilizes conventionally available driving mechanisms so as to supply clean air to the burners, and achieves a high rate of efficiency in providing large volumes of gas under pressure by means of the burners so as to effect the launching of aircraft. The configuration of pressurized gas controls in accordance herewith permits versatility in system design, and maximum efficiency in the use thereof.

Use of burners result in pressurized fluid having a higher temperature (i.e., 1000° F.), which lowers the Mach number of the fluid, thereby reducing pressure lost in transmitting the fluid along a long launching cylinder, and improving the speed of response of the system.

The foregoing and other features and advantages of the present invention will become more apparent in the light of the following detailed description of a preferred embodiment thereof as illustrated in the accompanying drawing.

DESCRIPTION OF THE DRAWINGS

FIG. 1 is a schematized plan view of an aircraft launching thrust orientation system in accordance with the present invention;

FIG. 2 is a partially broken away side elevation of the air source and accumulator taken on the line 2—2 in FIG. 1; and FIG. 3 is a diagram depicting the sequence of operations of the valves illustrated in FIG. 1.

DESCRIPTION OF THE EMBODIMENT

Referring now to FIG. 1, a pneumatic launching cylinder 10, which is adapted to propel a launching vehicle in a direction shown by the arrow in FIG. 1, is fed gas under pressure from either one of two burner units 12, 14, via a duct 16, or through a valve 4 from an airlock portion 10a of the pneumatic launching cylinder 10. The cylinder 10 may be suitably disposed within a supporting structure 11 such as described in said copending Feder et al. application. The airlock portion 10a in turn receives air under pressure via a duct 18 from a valve 2 which in turn is fed via a duct 20 from both an accumulator 22 and a duct 24. The duct 24 interconnects a plurality of clean air sources 26 which supply clean air to the accumulator 22 and, when a valve 1 is open, supplies clean air to one or the other of the burner units 12, 14 in dependence upon the setting of a pair of valves 28, 30 which are used to connect one of the burner units 12, 14 in line at a time; the other burner unit is in a standby condition so as to provide a redundant safety factor. As depicted more clearly in FIG. 2, the air sources 26 may each comprise an axial flow gas powered free turbine 32 (similar to the jet engines used in aircraft) which produce rotary motion in a shaft 34 that drives a fan 36 so as to provide high pressure clean air to the duct 24. Suitable other sources of power may be utilized, although the axial flow gas powered free turbine is a most efficient and economical, readily available unit for this purpose. The accumulator 22 is of a novel design for pressure air accumulators, comprising, in a preferred form, a round bottomed cylindrical tank 38 having a round bottomed cylindrical weight 40 disposed therein. The weight 40 is provided with a pair of cylindrical seals 42, 44 so as to confine the gas under pressure within the tank 38 to the area below the weight.

The burner units 12, 14 may each comprise a plurality of burner devices of the type used to supply the fuel combustion in a jet engine, the burners being capable of burning fuel from a source 46 at a very high rate during the time that an aircraft is being launched. A valve and burner control system 48 will control the valves 1–4 (in a manner illustrated in FIG. 3 and described hereinafter) and cause the burners 12, 14 to operate during a period from about the tenth through fortieth seconds in the cycle illustrated in FIG. 3. The nature of the valve and burner control, and the detail of the mechanisms for operating the valves 1–4, are not germane to the present invention, and any suitable devices may be selected from a large variety thereof which are well known in the prior art.

As described in said copending application of Tyler, it is desirable to be able to launch a plurality of aircraft, one after the other, in a succession of short cycles (60 second launch cycles, for example). In order to achieve this, launching apparatus may be returned to the launch initiating position (within the airlock portion 10a of the cylinder 10) by a circular track or other suitable means so that the launching apparatus may enter the cylinder 10 through an entrance portion 10b. The airlock portion 10a is provided to permit a second launching apparatus to achieve a position within the cylinder assembly 10 where it can receive thrust without waiting for a previous launching apparatus to complete its thrust receiving cycle. Thus, while a first launching apparatus is proceeding down the cylinder 10 (a portion thereof not shown), closure of the valve 4 permits a second launching vehicle to enter the airlock portion 10a while the first launching vehicle is still being driven by pressure out of duct 16. At this time (which may be in the neighborhood of the 40 to 60 second range of FIG. 3) valves 1 and 3 are open and valves 2 and 4 are closed, so that air is being supplied to the burners 12, 14 so as to drive the first launch vehicle, after which valve 1 is closed so that further burning ceases and the gas within the chamber 10 is merely allowed to expand at a decreased rate, whereby there will be a decreasing acceleration (not a deceleration) to the launch vehicle. Near the end of the 60 second cycle, valve 3 is closed so that the pressure may be maintained behind a vehicle standing in the airlock portion 10a, and valve 4 is open so as to permit passage of said vehicle from the airlock portion 10a to the main portion of the thrust cylinder 10. Valve 1 remains closed so that no air will pass into the burners 12, 14 but valve 2 is then opened at the start of the second cycle so that air from the accumulator and from the air sources 26 will pass through valve 2 along duct 18 and get behind the second launch vehicle as it stands in the airlock 10a. This will commence to accelerate the launch vehicle so that it will pass valve 4, after which valve 4 is closed, valve 2 is closed, and valve 1 is opened whereby the launch vehicle will then be propelled along the main portion of the thrust cylinder 10 by the expanded air output of one of the burners 12, 14 rather than by the raw air of the accumulator 22 and air sources 26. After valve 4 is closed, valve 3 can again be opened to permit a third launch vehicle to enter the airlock 10a, and the above-described cycle can be repeated.

Although the invention has been shown and described with respect to a preferred embodiment thereof, it should be understood by those skilled in the art that various changes and omissions in the form and detail thereof may be made therein without departing from the spirit and scope of the invention, which is to be limited and defined only as set forth in the following claims.

Having thus described a preferred embodiment of our invention, what we claim as new and desire to secure by Letters Patent of the United States is:

1. A fluid pressure system for aircraft launching apparatus comprising:

a burner unit adapted to be connected to a pneumatic thrust cylinder for impelling a piston downstream the connection thereof;

a source of fuel for said burner unit;

an air supply for supplying volumes of air under pressure to said burner unit, said air supply having an air accumulator tank including a gravity operated weighted piston, whereby said accumulator supplies air at a constant pressure regardless of the volume of air contained therein.

2. The invention described in claim 1 additionally comprising at least one additional burner unit;

and control means for selectively engaging one of said burner units in operative connection between said air supply and the connection to said pneumatic launch cylinder.

3. A fluid pressure system for aircraft launching apparatus comprising:

a burner unit adapted to be connected to a pneumatic thrust cylinder for impelling a piston downstream the connection thereof;

a source of fuel for said burner unit;

an air supply for supplying volumes of air under pressure to said burner unit;

an airlock extension of said cylinder, said airlock extension being upstream of the connection of said burners to said cylinder and having valve control means at opposite ends thereof whereby said airlock extension may be sealed off relative to said cylinder;

air communication means between said air supply and the upstream end of said airlock extension and bypassing said air around said burners;

and a plurality of valve means including control means therefor, said valve means being so oriented and controlled as to permit supplying air from said air supply to said airlock extension thus impelling a piston downstream therein, and impelling said piston into said pneumatic thrust cylinder downstream of said burner connection, the one of said valve means which separates said airlock extension from the pneumatic thrust cylinder proper being closed and said valves adjusted so that thereafter air is fed to said burners and said piston is continued to be impelled downstream within said launch cylinder by the output of said burners.

4. The invention described in claim 3 additionally comprising at least one additional burner unit;

and control means for selectively engaging one of said burner units in operative connection between said air supply and the connection to said pneumatic launch cylinder.

References Cited

UNITED STATES PATENTS

| 2,759,688 | 8/1956 | Gross | 244—63 |
| 2,799,988 | 7/1957 | Larrecq | 244—63 |
| 2,843,343 | 7/1958 | Ward | 244—63 |
| 2,906,475 | 9/1959 | Doolittle | 244—63 |

CARLTON R. CROYLE, *Primary Examiner.*

DOUGLAS HART, *Assistant Examiner.*

U.S. Cl. X.R.

244—63